US005093731A

United States Patent [19]

Watanabe et al.

[11] Patent Number: 5,093,731

[45] Date of Patent: Mar. 3, 1992

[54] IMAGE DATA RECORDING APPARATUS FOR STORING IMAGE DATA WITH A RECORDING-FINISHED CODE AND A RECORDING SEQUENCE CODE

[75] Inventors: Mikio Watanabe; Seiki Nishi, both of Tokyo, Japan

[73] Assignee: Fuji Photo Film Co., Ltd., Kanagawa, Japan

[21] Appl. No.: 195,761

[22] Filed: May 18, 1988

[30] Foreign Application Priority Data

May 19, 1987 [JP] Japan ............................ 62-120073

[51] Int. Cl.[5] ........................................ H04N 5/76

[52] U.S. Cl. ................................ 358/335; 358/906; 358/909; 360/35.1; 369/58

[58] Field of Search ............... 358/335, 341, 906, 909, 358/342, 311, 312, 319, 330, 328, 213.31, 213.26, 213.23, 213.13, 903; 360/33.1, 35.1, 14.1, 14.2, 14.3, 66, 10.1, 10.2, 10.3, 13, 19.1, 72.2; 369/32, 54; 365/230.01, 230.07, 230.09, 232, 238, 239

[56] References Cited

U.S. PATENT DOCUMENTS

| | | | |
|---|---|---|---|
| 4,420,773 | 12/1983 | Toyoda et al. | 358/906 |
| 4,456,931 | 6/1984 | Toyoda et al. | 358/906 |
| 4,489,351 | 12/1984 | d'Alayel de Costemore d'Arcs | 358/906 |
| 4,532,558 | 7/1985 | Oota et al. | 358/906 |
| 4,544,960 | 10/1985 | Konishi | 360/35.1 |
| 4,652,939 | 3/1987 | Baumeister | 360/69 |
| 4,777,537 | 10/1988 | Ueno et al. | 358/342 |
| 4,855,842 | 8/1989 | Hayes et al. | 358/342 |

FOREIGN PATENT DOCUMENTS 57-14260 1/1982 Japan .

*Primary Examiner*—Roy N. Envall, Jr.
*Assistant Examiner*—W. R. Young

[57] ABSTRACT

An image data recording apparatus is provided which includes a digital electronic still video camera for storing image data representative of a plurality of pictures. When the image data is recorded in the memory of a freely loadable/unloadable memory cartridge, a recording-finished code and recording sequence codes are stored in the memory which correspond to the image data recorded therein. Thereby, the order in which the plurality of pictures are recorded may be successively numbered even when undesired pictures are taken.

14 Claims, 4 Drawing Sheets 1 11 12 13 14 15 16 5 2 3 17 21 22 23 20 10
SIGNAL PROCESSING
A/D
SIGNAL PROCESSING
DATA SELECTOR
CONNECTOR
RECORDING-FINISHED CODE
RECORDING SEQUENCE CODE
$M_1$
$M_2$
$M_n$
DATA
ADDRESS
ADDRESS DESIGNATION
DECISION UNIT
RECORDING-FINISHED CODE GENERATOR
RECORDING SEQUENCE CODE GENERATOR
DATA INPUT UNIT
SYSTEM CONTROLLER
ADDRESS
DIGITAL ELECTRONIC STILL VIDEO CAMERA
MEMORY CARTRIDGE RECORDING-FINISHED CODE
RECORDING SEQUENCE CODE
M1
M2
Mn
ADDRESS
DATA
ADDRESS DESIGNATION
CONNECTOR
MEMORY CARTRIDGE
DIGITAL ELECTRONIC STILL VIDEO CAMERA
DATA SELECTOR
SIGNAL PROCESSING
A/D
RECORDING-FINISHED CODE GENERATOR
RECORDING SEQUENCE CODE GENERATOR
DECISION UNIT
SYSTEM CONTROLLER
DATA INPUT UNIT

IMAGE DATA RECORDING APPARATUS FOR STORING IMAGE DATA WITH A RECORDING-FINISHED CODE AND A RECORDING SEQUENCE CODE

BACKGROUND OF THE INVENTION

1. Field of the Invention

This invention relates to an image data recording apparatus including a digital electronic still video camera, in which digital video data representing a still picture imaged by the camera is recorded on a freely loadable/unloadable memory cartridge, and a device for extracting one frame of a still video signal from an inputted moving video signal, converting the extracted video signal into a digital signal, and recording the digital signal on the memory cartridge in the same manner as the digital still video camera.

2. Description of Related Art

An example of a digital electronic still video camera of the above-mentioned kind is described in the specification of Japanese Patent Application Laid-Open (KOKAI) No. 57-14260. The electronic camera is equipped with a memory having a plurality of memory cells (storage areas) each storing one frame of data for a subject, so that it is possible to select the memory cell for storing the image data. In a case where the memory cell selected has data recorded therein, the previously recorded image data will be erased when the new image data is written in such a memory cell. Accordingly, the electronic camera is equipped with a sensing circuit for sensing whether each memory cell is used or unused, and a display device for displaying the results of the sensing operation performed by the sensing circuit. The display device includes a display for indicating whether each memory cell is used or unused.

With an arrangement of this kind, the user of the electronic still video camera is prevented from accidentally recording newly taken image data in a used memory cell.

However, there are times when it is desired to intentionally record newly taken image data in a used memory cell. Examples of these times are when the user fails to shoot a previous scene properly and wishes to retake the picture, and when image data in the used memory cell is no longer needed. When the camera is used in this way, the order in which the memory cells are arrayed fails to coincide with the order in which pictures are taken. The order or sequence in which pictures are taken, namely the order in which image data is recorded, is a very important factor in terms of utilizing the image data at a subsequent time. For example, when a number of pictures that have been taken are to be subsequently compiled based on a fixed plan, information regarding the order in which the pictures are stored is vitally important. One solution to this problem is to write down information identifying the photographed subject, etc. each time in correlation with the order in which the pictures were taken, but this is a very troublesome task, and the user may forget to make entries or make inaccurately.

SUMMARY OF THE INVENTION

An object of the present invention is to provide an image data recording apparatus that enables the order in which plural items of image data are recorded to be ascertained without requiring any labor for this purpose.

According to the present invention, the foregoing object is attained by providing an image data recording apparatus comprising first code generating means for generating a recording-finished code representing the fact that image data has been recorded in a freely loadable/unloadable memory cartridge having a memory capable of recording image data constituting a plurality of pictures, second code generating means for generating a recording sequence code incremented whenever image data is recorded, and control means operative, when image data is recorded in the memory of the memory cartridge, for storing the recording-finished code and recording sequence code generated by the first and second code generating means in a predetermined area of the memory in correspondence with the image data recorded. The memory cartridge referred to here is one in which a semiconductor memory is incorporated in a case or cartridge, and may include a memory card.

In accordance with the present invention, the recording sequence code is incremented whenever image data far being recorded is stored to correspond with recorded image data when this data is recorded. Since the code indicating the recording sequence is stored automatically in correspondence with the recorded image data, the user is capable of subsequently ascertaining the order in which the items of image data were recorded without performing any additional operations. In a case where new image data is recorded in an area already recorded on and this previous image data is erased as a result, the previous recording sequence code is also erased and a new recording sequence code is stored in its place. Though the previous recording sequence code that has been erased becomes a missing number, no problem is encountered in ascertaining the prevailing sequence because the relative sizes of the numerals represented by the recording sequence codes are preserved which correspond exactly to the recording sequence.

In accordance with the invention, when plural items of image data are stored, the codes representing the recording sequence are preserved whenever image data is stored, even if storing of the items of image data involves rewriting the memory. Thereby, it is possible to ascertain the recording sequence at a subsequent time. Accordingly, the invention is useful for picture compilation as well as other purposes.

Other features and advantages of the present invention will be apparent from the following description taken in conjunction with the accompanying drawings, in which like reference characters designate the same or similar parts throughout the figures thereof.

The present invention will become more fully understood from the detailed description given hereinbelow and the accompanying drawings which are given by way of illustration only, and thus, are not limitative of the present invention, and wherein:

DETAILED DESCRIPTION OF THE PREFERRED EMBODIMENTS

Figure 1:
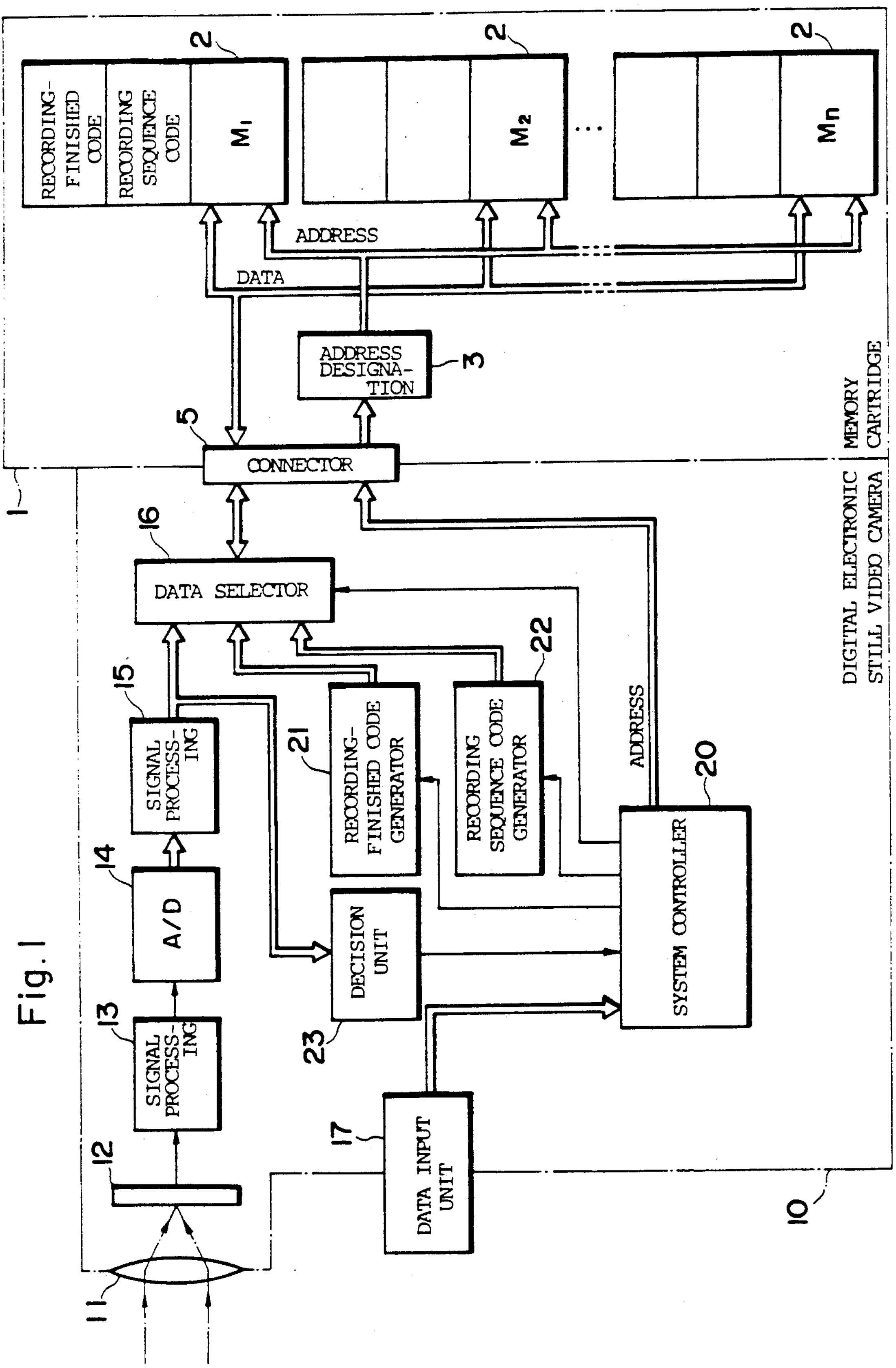
FIG. 1 is a block diagram illustrating the electrical construction of an electronic still video camera and a memory cartridge.

FIG. 1 illustrates the electrical construction of a digital electronic still video camera 10 and a memory cartridge 1 that is freely loadable and unloadable to and from the camera 10.

Photography in the digital electronic still video camera 10, transfer of the resulting image data, recording-finished code and recording sequence codes to the memory cartridge 1, and other processing operations are controlled by a system controller 20. The system controller 20 includes a CPU, a ROM for storing the execution program of the CPU, and a RAM for storing the required data.

An image of a subject is focused on an image sensor 12 via an optical system 11, and the image sensor 12 outputs a video signal indicative of the image. After being subjected to the required signal processing operations such as amplification, exposure adjustment and white balance adjustment by a signal processing circuit 13, the video signal is converted into a digital signal by an A/D converter circuit 14. This digital signal is subjected to further necessary processing operations, such as separation the digital signal into color components by a signal processing circuit 15. The result is as image data sent from the circuit 15 to a data selector 16.

A recording-finished code generating circuit 21 generates a predetermined recording-finished code having a prescribed number of bits. This code is applied to the data selector 16 in response to a command from the system controller 20.

A recording sequence code generating circuit 22, which may, for example, include a counter, generates a recording sequence code incremented each time image data is written in the memory cartridge 1. This code indicates a numeral representing a recording sequence. The operation for incrementing the recording sequence code in the generating circuit 22 and the transfer of the generated recording sequence code to the data selector 16 are controlled by the system controller 20.

A decision circuit 23 decodes the recording-finished code (or a code indicating that an image memory is blank) and the recording sequence code read out of the memory cartridge 1 which is received via a connector 5 and the data selector 16. The system controller 20 is provided with the results of the decoding operation, namely data indicating whether a recording has been made as well as the number of the recording sequence.

The functions of the circuits 21, 22 and 23, namely the generation of the recording-finished code, the generation of the recording sequence code and the decoding of these codes, are performed by the CPU in the system controller 20.

An input unit 17 includes push-buttons which provides an instruction for playing back video data recorded in the memory cartridge 1 in a view finder (not shown), and an instruction for erasing the image data when this operation is necessary. The view finder includes a display device for displaying output image data from the signal processing circuit 15 and image data read out of the memory cartridge 1. An example of the view finder is a liquid crystal display device. The display of a recorded image (the image read out of the memory cartridge) in the view finder may be carried out in accordance with a fixed sequence (e.g. the order of memory addresses), or the input unit can be provided with a keyboard for allowing the operator to designated the identification number of a picture to be played back.

The data selector 16, which is controlled by the system controller 20, sends the above-mentioned image data, the recording-finished code or the recording sequence code to the memory cartridge 1, depending upon which is designated.

The foregoing is a description of processing and flow operations relating mainly to data (i.e. a description of the data bus). However, the electronic still video camera 10 naturally includes an address bus as well, a portion of which is indicated as a bus from the system controller 20 to the connector 5. This is for designating an address at which image data is to be written in the memory of the memory cartridge 1 or an address from which image data is to be read out of the memory.

Upon being loaded in the camera 10, the memory cartridge 1 is electrically connected to the abovementioned circuitry in the camera 10 by the connector 5. The connector 5 includes a connector provided on the camera side and a number of terminals provided on the cartridge.

The memory cartridge 1 internally incorporates several image memory chips, an address designating circuit 3 for decoding the address signal provided by the system controller 20 of camera 10 and designating the memory area specified by the decoded signal, and a battery (not shown) for supplying the memories with operating power. Each image memory chip stores one or plural frames of image data, depending upon the capacity of the memory chip. For the sake of the description, an area or memory chip which stores one frame of image data shall be referred to as an image memory 2 in FIG. 1. If the memory chip is non-volatile, the image memory 2 will not require the afore-mentioned battery. Depending upon the particular case, it is also possible to adopt an arrangement in which operating power is supplied from the side of camera 10 via the connector 5 in order to operate other required circuitry.

The image memories 2 are connected to the data selector 16 of camera 10 by the data bus. Each image memory 2, in addition to having an area for storing image data, is also equipped with a location for storing a recording-finished code and a location for storing a recording sequence code. The image memories 2 are provided with numbers $M_1$, $M_2$, . . . $M_n$, so that these numbers are in accordance with the order in which the image memories 2 are arrayed. When it is necessary to distinguish among these plurality of image memories 2, these numbers will be used. Rather than storing the recording-finished codes and recording sequence codes in each of the image memories 2, it is permissible to adopt an arrangement in which these codes are stored in a separately provided data memory to correspond to the image memory numbers $M_1$, $M_2$, . . . $M_n$.

An example of the operation of the digital electronic still video camera and an example of a playback operation using a playback apparatus will be described next.

Figure 2:
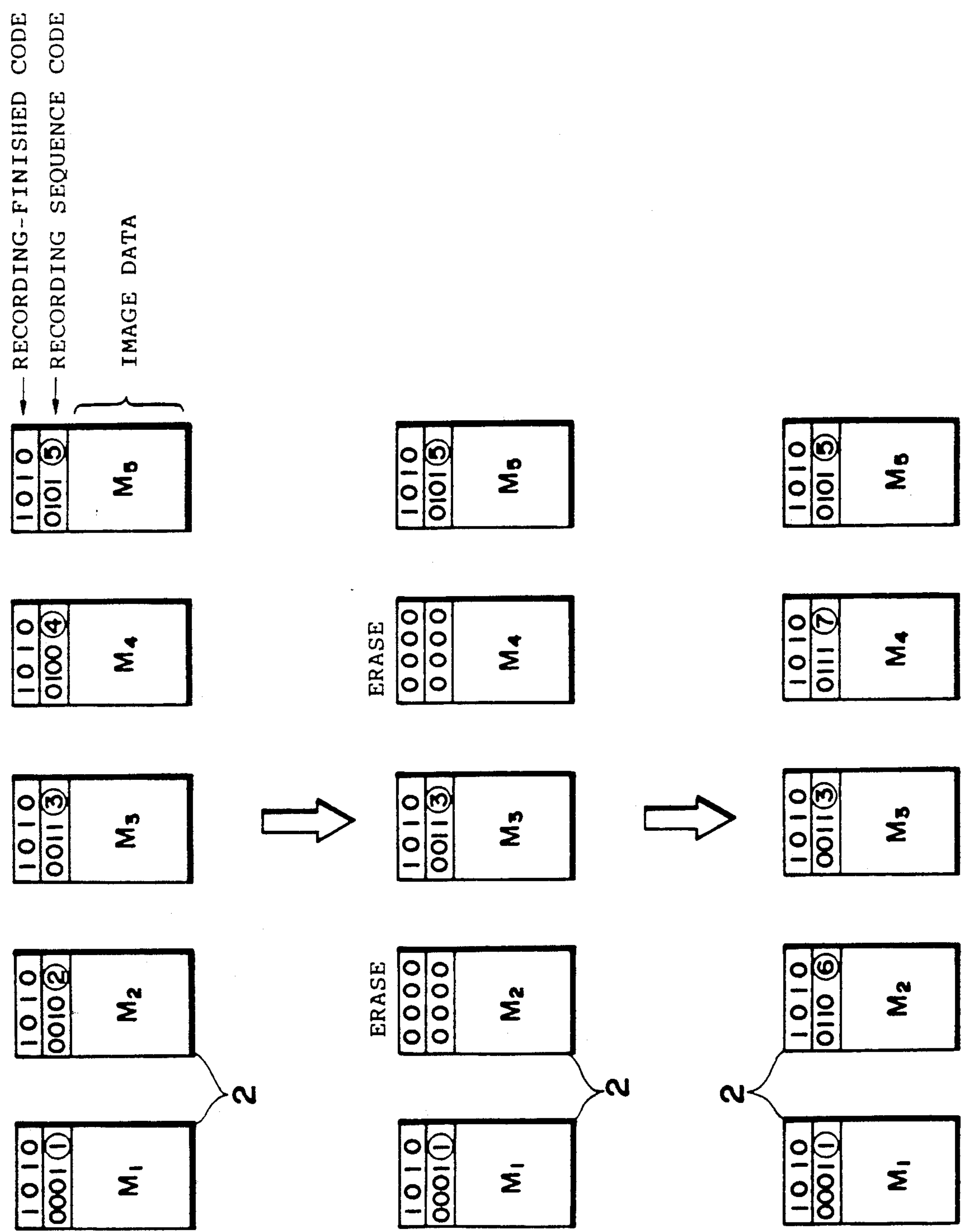
FIG. 2 is a view illustrating data recorded in the image memories of a memory cartridge, as well as a procedure for erasing and re-recording data.

The upper row of FIG. 2 illustrates the manner in which image data, a recording-finished code and a recording sequence code are stored in each image memory 2. For the sake of simplicity, it will be assumed that $n=5$, so that there are five image memories $M_1$ through $M_5$. The code 1010 shall be employed as the recording-finished code. Since image data will be recorded in the order of the image memories $M_1$ through $M_5$, the recording sequence codes are stored in the image memories as follows: a recording sequence code 0001 (=1) in the image memory $M_1$, a recording sequence code 0010 (=2) in the image memory $M_2$, and so on, with a recording sequence code 0101 (=5) being stored in the last image memory $M_5$.

More specifically, the content of the recording sequence code generating circuit 22 in the camera 10 is cleared first of all. When the first frame of an image has been shot, the image data is stored in the first image memory $M_1$ via the data selector 16 and connector 5. The content of the recording sequence code generating circuit 22 is incremented by +1 to produce the recording sequence code which, together with the recording-finished code outputted by the generating circuit 21, is transferred to the same image memory $M_1$ to be stored therein. The address of this storage location is designated by the system controller 20.

When the second frame of video is obtained, the resulting image data is transferred to the second image memory $M_2$, and the recording sequence code, which is updated by being incremented by +1, is transferred to and stored in the same memory M2 together with the recording-finished code.

The image memories are thereby provided with data as illustrated in the upper row of FIG. 2.

With the memory cartridge 1 loaded in the camera 10, the user of the camera is capable of reading the image data out of the image memories in an order starting from the image memory $M_1$ to display the data in the view finder. When a playback command is inputted from the input unit 17, the system controller 20 first designates the memory $M_1$ and reads out the recording-finished code thereof. When the result of the decoding operation performed by the decision circuit 23 is that the memory $M_1$ has been recorded on, a command for reading out this image data is applied. Accordingly, the read image data is displayed in the view finder. When the memory $M_1$ has not been recorded on, a read-out of image data from this image memory is not performed. When the user applies a forward-feed command from the input unit, or when a fixed time period elapses, the image data in the second image memory $M_2$ is read out and displayed.

If the user enters an erase command from the input unit 17 when still pictures are thus sequentially displayed in the view finder, the recording-finished code and the recording sequence code are reset (to 0000) in the image memory corresponding to the picture being displayed. The middle row in FIG. 2 illustrates the manner in which the codes are erased from the second memory $M_2$ and the fourth memory $M_4$.

It is permissible to adopt an arrangement in which the user is called upon to input the number of the memory whose image is to be erased or the recording sequence code. In the latter case, a number indicating the recording sequence would be displayed in the view finder.

Image data obtained by newly photographing a subject can be recorded by the user in an image memory erased as set forth above.

The content of the recording sequence code generating circuit 22 is assumed to be 5. The next time a picture is taken, the code is incremented by +1, so that the circuit 22 generates a recording sequence code equivalent to 6. This recording sequence code will be recorded in the second image memory $M_2$ along with the image data and the recording-finished code. The system controller 20 stores the numbers of the image memories erased and designates the image memories in numerical order starting from the smallest number. When the user takes a picture again, the image data is stored in the fourth image memory $M_4$. The recording sequence code at this time is 7. The image memories in which the new image data and various codes are thus written are illustrated in the bottom row of FIG. 2. Looking at the recording sequence codes in the order to the memories $M_1$ through $M_5$, it is found that the codes are 1, 6, 3, 7 and 5. Though the sequence codes 2 and 4 are no longer present, the recording sequence is known from the size relationship among the numbers expressed by the recording sequence codes. In other words, the recording sequence is preserved. Accordingly, it is possible for still pictures to be displayed by a playback apparatus in accordance with this recording sequence, as will be described below by way of example.

The above-mentioned processing operations for erasing unnecessary image data can also be performed by a playback apparatus. The memory cartridge can be freely loaded and unloaded in and from the playback apparatus. When the cartridge is loaded, the circuitry in the playback apparatus and the memory cartridge are electrically connected. The playback apparatus includes a system controller for controlling the reading and writing of image data relative to the memory of the memory cartridge, and a display device (such as a liquid crystal device or CRT) for displaying the read digital image data directly or following the read digital image data being converted into an analog signal.

The memory cartridge 1 is unloaded from the camera 10 and loaded in the playback apparatus. Through a procedure similar to the procedure described above, a recording-finished code and a recording sequence code corresponding to unnecessary image data stored in an image memory inside the memory cartridge 1 are reset by the playback apparatus.

The memory cartridge is subsequently reloaded in the camera 10. When the system controller 20 of the camera 10 senses loading of the memory cartridge 1 (as by a loading sensor), the recording-finished codes and recording sequence codes of all of the image memories are read out, the numbers of image memories that have not been recorded on are stored, and the maximum value of a recording sequence code is found. The maximum value is preset in the recording sequence code generating circuit 22. Accordingly, when the camera 10 next performs a photographic operation, the resulting image data are stored in the blank image memories, and recording sequence codes are assigned to these memories starting from the afore-mentioned maximum value which has been incremented by one.

Figure 3:
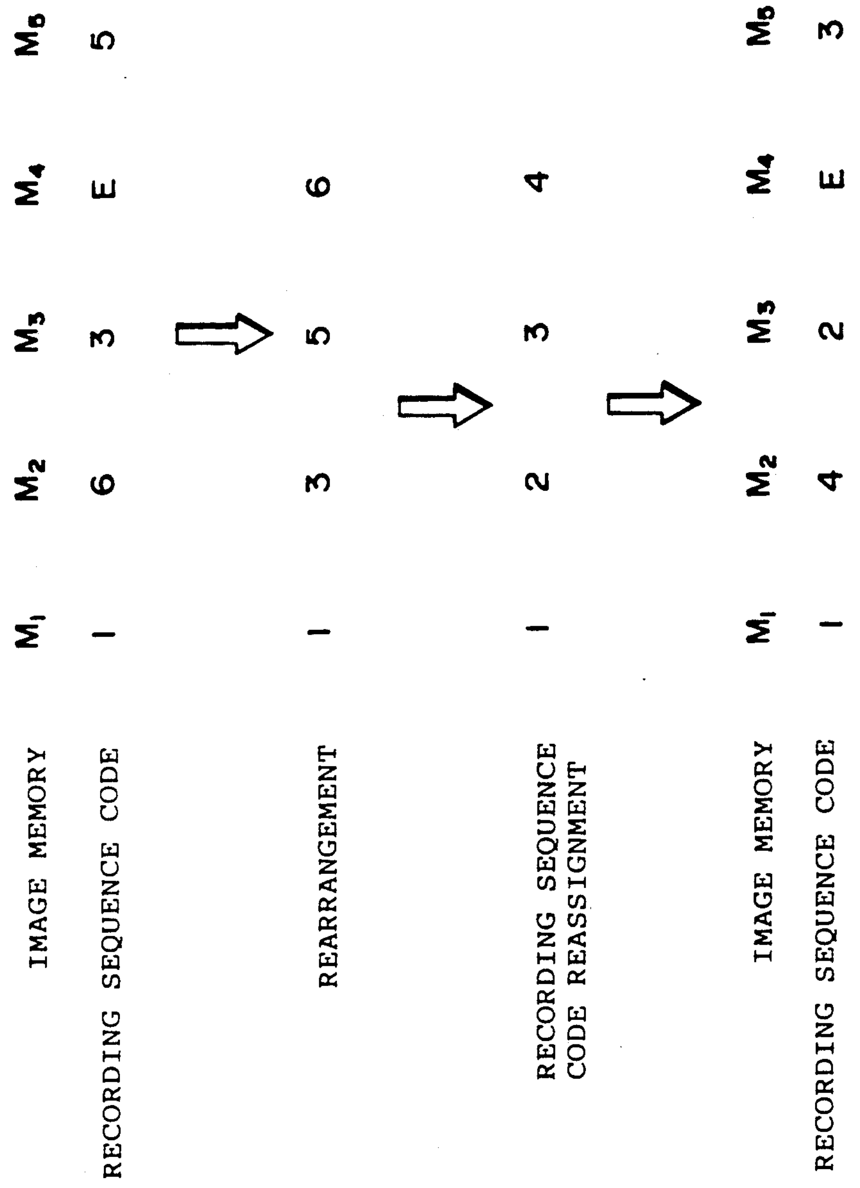
FIG. 3 is a view illustrating a processing procedure for reassigning recording sequence codes in image memories.

When recording is performed again after erasing the recording-finished codes and the recording sequence codes, the erased recording sequence codes become missing numbers, as indicated by the bottom row of FIG. 2. Though the recording sequence is preserved by the relative magnitudes of the recording sequence codes, the sequence is somewhat difficult to grasp. Accordingly, the playback apparatus is preferably provided with a function for processing so that the recording sequence codes will be reassigned while the recording sequence remains intact. FIG. 3 illustrates an example of a processing procedure for reassigning recording sequence codes, where the processing is executed by a CPU in the system controller of the playback apparatus. In the uppermost row of FIG. 3 it is assumed that the recording sequence codes are assigned and are the same as the codes illustrated in the bottom row of FIG. 2 with the exception of the fourth memory $M_4$. Because the fourth memory $M_4$ is blank, the recording sequence code thereof has been reset. The character E is assigned to this image memory in FIG. 3.

When the memory cartridge is loaded in the playback apparatus, still pictures are displayed on the display device in the order of the image memories. At such a time, the recording sequence code is also displayed by being superimposed on a portion of the picture.

The CPU of the playback apparatus stores the recording sequence codes in a predetermined area of the memory in the order in which the pictures are played back. Next, the recording sequence codes are rearranged in an order starting from the smallest code (see the second row from the top in FIG. 3). The character E is ignored. (Preferably, the aforementioned display of still pictures is not performed at this time.) After the codes are rearranged, the recording sequence codes representing consecutive numbers devoid of missing numbers are assigned (see the third row from the top in FIG. 3). Finally, the reassigned recording sequence codes are stored in the corresponding image memories (see the bottom row in FIG. 3).

When consecutively numbered recording sequence codes are thus assigned to recorded image data, these recorded data are easily read out and displayed in accordance with the recording sequence. It is possible to adopt an arrangement in which the reassignment of the recording sequence codes is carried out by the electronic still video camera.

Figure 4:
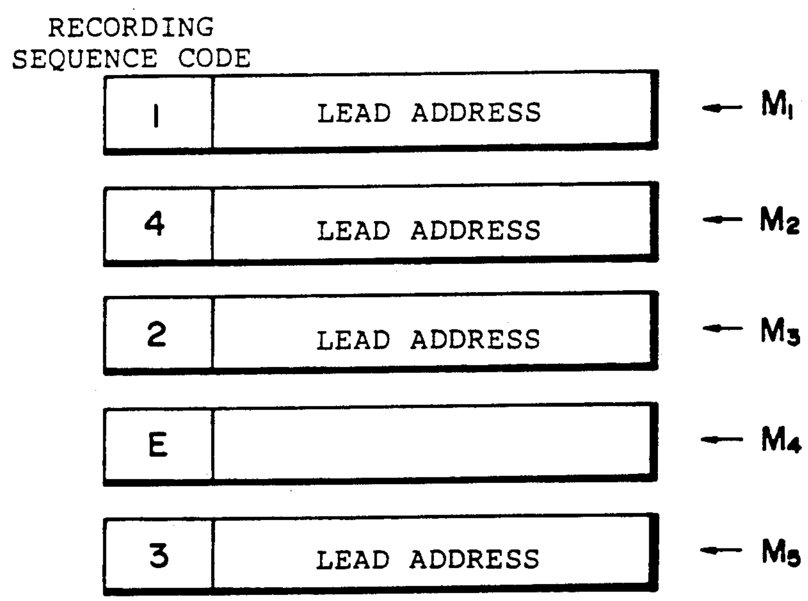
FIG. 4 is a view illustrating a table prepared in a case where a display is presented in accordance with a recording sequence in a playback apparatus.

The CPU of the playback apparatus prepares a table in a predetermined area of its memory. As illustrated in FIG. 4, the table includes recording sequence codes corresponding to the image memories $M_1$ through $M_5$, and the lead addresses of the areas at which the image data are stored. The CPU retrieves this table using the recording sequence codes as a key and first reads out the lead address of the recording sequence code 1 and presets this address in an address counter for image memory read-out. When the counter is successively incremented, one frame of the image memory data corresponding to the recording sequence code 1 is read out and this still picture is displayed on the display device. When a forward-feed command is inputted or a fixed period of time elapses, the CPU then reads the lead address corresponding to the next recording sequence code 2 out of the table and executes the display processing in the same manner. Thus, still pictures are displayed in an order corresponding to the recording sequence and the display of the picture assigned with the character E is unnecessary.

As many apparently and widely different embodiments of the present invention can be made without departing from the spirit and scope thereof, it is to be understood that the invention is not limited to the specific embodiments thereof except as defined in the appended claims.

What is claimed is:

1. An image data recording apparatus for recording image data including a plurality of pictures, comprising:
   first code generating means for generating a recording-finished code representative of whether one of the plurality of pictures of the image data has been recorded in a freely loadable/unloadable memory cartridge having a semiconductor memory capable of recording the image data including the plurality of pictures in a first predetermined area of said semiconductor memory;
   second code generating means for generating a recording sequence code indicative of a recording sequence for each of the plurality of pictures recorded in said memory cartridge, said recording sequence code being incremented whenever one of the plurality of pictures of the image data is recorded in said memory cartridge; and
   control means, operative in response to each of the plurality of pictures of the image data being recorded in said semiconductor memory of said memory cartridge, for storing said recording-finished code and said recording sequence code generated by said second code generating means for each of the plurality of pictures of the image data in a second predetermined area of said semiconductor memory in correspondence with the image data recorded in said first predetermined area of said semiconductor memory.

2. The apparatus according to claim 1, wherein the image data recording apparatus comprises an electronic still video camera.

3. The apparatus according to claim 1, further comprising:
   reading means for reading prescribed image data from said first predetermined area of said semiconductor memory of said memory cartridge which has the image data recorded therein; and
   display means for displaying one of the plurality of pictures expressed by said prescribed image data read by said reading means.

4. The apparatus according to claim 3, wherein said prescribed image data are read out and displayed in accordance with said recording sequence represented by said recording sequence code for each of the plurality of pictures of the image data.

5. The apparatus according to claim 1, further comprising:
   input means for inputting an erase command; and
   clearing means for clearing at least one of said recording-finished code and said recording sequence code for one of the plurality of pictures of the image data, which corresponds to designated image data to be erased from said first predetermined area of said semiconductor memory of said memory cartridge responsive to said erase command inputted by said input means.

6. The apparatus according to claim 5, further comprising reassigning means for reassigning said recording sequence code for each of the plurality of pictures of the image data, when said recording sequence of said recording sequence codes for each of the plurality of pictures of the image data stored in said second predetermined area of said semiconductor memory fails to include each recording sequence code in said recording sequence so that said recording sequence of said recording sequence code for each of the plurality of pictures of the image data is expressed as consecutive codes.

7. The apparatus according to claim 6, further comprising means for reading said recording sequence code for each of the plurality of pictures of the image data from said second predetermined area of said semiconductor memory of said memory cartridge and discriminating a maximum value of said recording sequence of said recording sequence code of each of said plurality of pictures of the image data or discriminating a maximum value of said recording sequence code for each of the plurality of pictures of the image data reassigned by said reassigning means, said second code generating means generating a discriminated recording sequence code representative of said recording sequence code having said maximum value being incremented by one.

8. The apparatus according to claim 1, wherein said freely loadable/unloadable memory cartridge comprises a memory card including said semiconductor memory therein.

9. A method for recording image data including a plurality of pictures, comprising the steps of:

(a) generating a recording-finished code representative of whether one of the plurality of pictures of the image data has been recorded in a freely loadable/unloadable memory cartridge having a semiconductor memory capable of recording the image data including the plurality of pictures in a first predetermined area of said semiconductor memory;

(b) generating a recording sequence code indicative of a recording sequence for each of the plurality of pictures recorded in said memory cartridge, said recording sequence code being incremented whenever one of the plurality of pictures of the image data is recorded in said memory cartridge; and (c) storing said recording-finished code and said recording sequence code for each of the plurality of pictures of the image data generated at said steps (a) and (b) in a second predetermined area of said semiconductor memory in response to each of the plurality of pictures of the image data being recorded in said memory cartridge.

10. The method according to claim 9, further comprising the steps of:

(d) reading prescribed image data from said first predetermined area of said semiconductor memory of said memory cartridge having the image data recorded therein; and (e) displaying one of the plurality of pictures expressed by said prescribed image data read at said step (d).

11. The method according to claim 10, wherein said prescribed image data are read out and displayed in accordance with said recording sequence represented by said recording sequence code for each of the plurality of pictures of the image data.

12. The method according to claim 9, further comprising the steps of:

(f) inputting an erase command; and (g) clearing at least one of said recording-finished code and said recording sequence code for one of the plurality of pictures of the image data corresponding to designated image data to be erased from said first predetermined area of said semiconductor memory of said memory cartridge responsive to said erase command inputted at said step (f).

13. The method according to claim 12, further comprising the step of reassigning said recording sequence code for each of the plurality of pictures of the image data when said recording sequence of said recording sequence code for each of the plurality of pictures of the image data stored in said second predetermined area of said semiconductor memory fails to include each consecutive recording sequence code in said recording sequence so that said recording sequence of said recording sequence code for each of the plurality of pictures of the image data is expressed as consecutive codes.

14. The method according to claim 13, further comprising the step of reading said recording sequence code for each of the plurality of pictures of the image data from said second predetermined area of said semiconductor memory of said memory cartridge and discriminating a maximum value of said recording sequence of said recording sequence code for each of the plurality of pictures of the image data or discriminating a maximum value of said recording sequence code for each of the plurality of pictures of the image data reassigned by said step of reassigning wherein a discriminated recording sequence code representative of said recording sequence code having said maximum value being incremented by one is generated at said step (b).

* * * * *